Aug. 16, 1949.   E. ROSE   2,478,945
RELAY TESTER
Filed Jan. 11, 1946   3 Sheets-Sheet 2
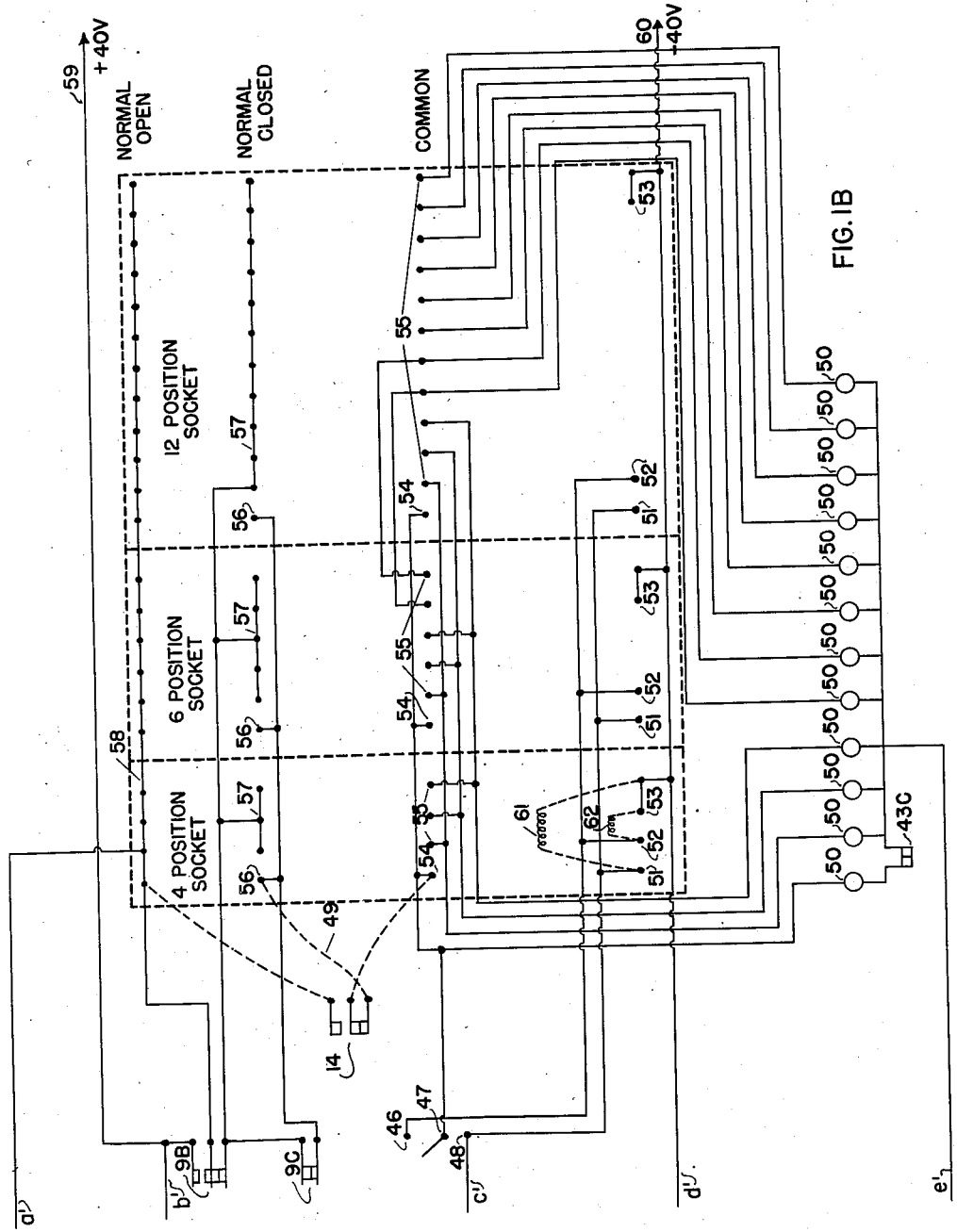
FIG. IB
Inventor
ERNEST ROSE
By M. O. Hayes
Attorney Aug. 16, 1949.  E. ROSE  2,478,945
RELAY TESTER Filed Jan. 11, 1946  3 Sheets-Sheet 3

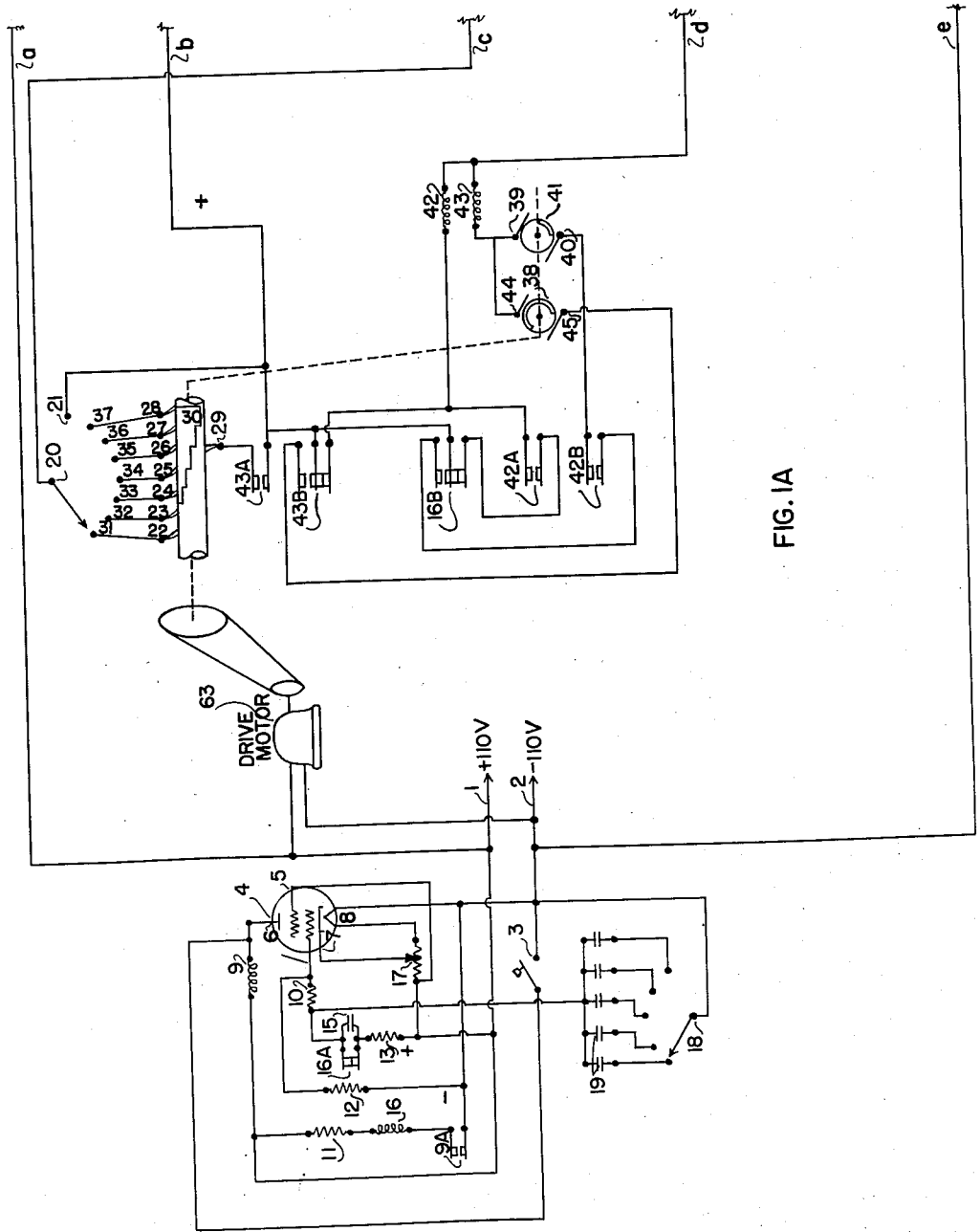
FIG. IA
Inventor
ERNEST ROSE

Inventor
ERNEST ROSE

By M. O. Hayes
Attorney

Patented Aug. 16, 1949

2,478,945

UNITED STATES PATENT OFFICE 2,478,945

RELAY TESTER

Ernest Rose, United States Navy

Application January 11, 1946, Serial No. 640,639

4 Claims. (Cl. 175—183)

(Granted under the act of March 3, 1883, as amended April 30, 1928; 370 O. G. 757)

This invention relates to a relay tester, and particularly one for quickly and automatically testing large numbers of relays.

In the use of electrical accounting machinery, telephone systems, or other equipment involving the use of many relays; it is frequently necessary to test these relays for proper operation. To do this singly by setting up a different test circuit for each relay would involve a prohibitive amount of time, and a test circuit into which a relay may be quickly connected and tested is very desirable for this work.

One object of this invention is to provide a tester into which a relay may be plugged and quickly tested.

Another object is to provide an automatic means for testing the pick-up time of a relay.

A further object is to provide an automatic means for testing the contact points and circuit continuity of a relay.

Other objects and advantages will be apparent from the following specification in conjunction with the appended claims.

The device of this invention consists of three principal units; which are, a tube controlled oscillator, a mechanical impulse timer, and socket assemblies with indicator lights. The oscillator is a device for initiating operating pulses to the relay; and thereby determining the frequency of tests, which may be from fifty times per second down to two or three per second. These limits are given by way of example only, and may be made any value depending on the types of relays for which the tester is designed.

The timing of the impulse to the relay is done by the mechanical timer which provides an adjustable impulse to test pickup time.

Relay sockets are connected with indicator lights which show the operation of each set of contacts. The proper sockets or other connecting means are provided for the particular kinds of relays to be tested.

The invention may be more easily understood by the following description in connection with the accompanying drawings, in which:

Figures 1A and 1B are a schematic circuit diagram of the invention.

Figure 2:
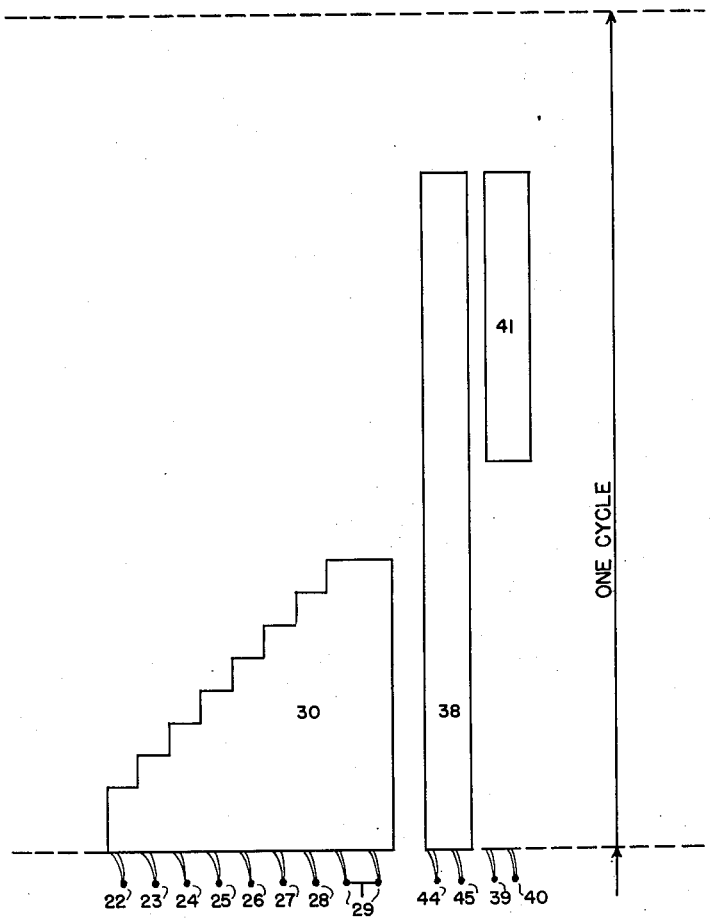
Figure 2 is a diagram showing the timing of the cams.

Referring now to Figures 1A and 1B, relay contact points are designated by the same number as the coil followed by the letters A, B, and C. Two sources of power are used; direct current at line voltage to operate the tube oscillator, the timer motor, and the indicator lights, and direct current of the proper voltage for the relays being tested.

The relays under test may be of either the four position, six position, or twelve position type. A four position relay is one which generally has one or two operating coils thereon, either of which when energized is capable of operating four sets of contacts simultaneously. Each set of contacts comprises two fixed and one movable contact, the latter of which is moved when an operating coil is energized from a position normally in contact with one of the fixed contacts, called a front contact, into a position in contact with the other of the fixed contacts, called a back contact. For convenience in replacement, the coil terminals and the contact terminals are brought out to fixed plugs arranged at definite positions at the bottom of the relay so that defective relay may easily be removed from the particular apparatus in which it is being used and replaced by a duplicate relay which may be readily plugged into position.

The six and twelve position relays are constructed in a similar manner to the four position relay except they are provided respectively with six and twelve sets of contacts.

In Fig. 1B, the tester of this invention is shown with socket boards for receiving for test purposes any one of the three types of relays described above. Each socket has a sufficient number of socket plug terminals in the proper locations for receiving the plugs of the particular type of relay to be tested in such socket whereby the relay may be rapidly plugged in or withdrawn for purposes of test. In Fig. 1B, the four position socket is illustrated as having a four position relay diagrammatically connected thereto, the coils of such relay being shown at 61 and 62 plugged into socket terminals 51, 52 and 53, and only one set 14 of the four sets of contacts being shown plugged into the four position socket to socket terminals 54, 56 and 58. It will be understood that the remaining sets of contacts are plugged in a similar manner to the remaining sets of plug sockets 55, 57 and 58 but are not shown to avoid undue complication of the drawing.

The manner of operation of the tester with a four position relay plugged therein will be described hereinafter and it will be understood that the test of a six position relay and a twelve position relay will follow the same operation so that it is unnecessary to describe the latter in detail.

The circuit to light indicator bulbs 50 when the relay is in a normal deenergized position will be as follows: Line 1, line $a$, line $a'$, contact points 9B and 9C, socket terminal 56, relay points 14, socket terminal 54, indicator light 50, contact points 43C, to line $e'$, line $e$ and line 2. At the same time a circuit for the remainder of the contact points of the relay will be made as follows:

Line 1, line $a$, line $a'$, contact points 9B, relay terminals 57, contact points 14, relay terminals 55, indicator lights 50 to line 2 as before. Any failure of contact points 14 to close in their normally closed front contact position will cause the corresponding indicator light circuit to be broken.

Impulses from the oscillator initiate the individual test cycles. Relay coil 9 is under control of vacuum tube 4. Resistors 10, 12, and 13 control the potential of grid 6. At the start of oscillation grid 6 is positive in relation to cathode 7, the tube being in a state of conduction. Relay 9 will then be energized, points 9A will energize relay 16, opening points 16A. Condenser 19 will gradually discharge through resistors 10 and 12 reducing the potential of grid 6 toward the negative side of the line, until the tube approaches cutoff. At the time the plate current approaches zero relay 9 will deenergize dropping relay 16 and returning points 16A to normal. This causes condenser 19 to charge in the opposite direction through resistor 13 thereby impressing a gradual positive potential on grid 6 which, after a given time, depending on the size of condenser 19, will cause the tube to conduct and again pick up relays 9 and 16, to repeat the operation. Thus it can be seen that the conduction of tube 4 is dependent on the size of condenser 19. From the previous description, it is obvious that relay 9 is intermittently energized and deenergized at a rate determined by the setting of contactor 18 which is adjustable to place into the circuit controlling tube 4 any one of a plurality of condensers 19 of different capacity. The intermittent energization of relays 9 and 16 in response to energization of tube 4 causes intermittent closure of the normally open or back contacts 16B, Fig. 1A, and 9B, Fig. 1B, with simultaneous opening of contacts 9C and normally closed or front contacts 9B.

The purpose of condenser 15 is to maintain the grid potential momentarily at the time contact points 16A are first opened. By proper selection of grid resistors 10, 12, and 13 the duration of the times that relay 9 is energized, and deenergized, can be made equal.

Resistor 17 is in the heater line, serving as a voltage dropping resistor and grid potential adjustment. Push button 3 is for the manual operation of relays 9 and 16.

The timer is a device for selectively timing the duration of the pick-up impulse to the relay being tested. Driving motor 63 operates cams 30, 38, and 41 at a constant rate of speed. Dial switch 20 selects the segment of cam 30 for the desired cam duration. This cam may be divided as shown in Figure 2 between two and eight milliseconds in steps of one millisecond each. The timing of these cams will of course be designed for all types of relays to be tested.

Transfer contact points 16B when closed by energization of relay 16, control operation of the timer circuit. Relay 42 being energized by a circuit extending from positively energized conductor $b$, through front contacts 43B, relay 42, to negative conductor $d$, it will close points 42B, and at the time points 16B transfer, a circuit will be established to pickup relay 43 as follows: Line 59, line $b'$, line $b$, points 16B transferred, points 42B, cam 41, and relay coil 43, line $d$, line $d'$, to line 60.

Contact points 43B transferring will drop out relay 42 preventing relay 43 from getting a second impulse through cam 41, meanwhile relay 43 will hold for the duration of cam 38 by a circuit completed from line $b$, back contacts 43B, cam 38, relay 43, and line $d$, thereby closing contact points 43A for one cam cycle only. The closing of points 43A will allow a timed impulse to energize coil 61 of the relay under test as follows: Line 59, line $b'$, line $b$, to contact points 43A, common brush 29, contact commutator 30, brush 22 to 28, depending upon setting of dial switch 20, desired segment of dial switch, rotor 20, line $c$, line $c'$, terminal 48 of single pole double throw switch 46—48, socket contact terminal 51, relay coil 61, and socket contact terminal 53 to line 60.

If the relay is adjusted properly to become energized for the rated time impulse of cam 30, a holding circuit will be established for the relay under test, as follows: Line 59 to points 9B transferred, socket contact terminal 58, transferred contact points 14, socket contact terminal 54, single pole double throw switch 47—48, socket contact terminal 51, relay coil 61, and socket contact terminal 53, to line 60. At this time a circuit will be completed to operate indicator lights 50 as follows: Line 1 through lines $a$ and $a'$ to socket contact terminals 58, through transferred contact points 14, terminals 54, and 55; and lights 50 to line 2. At the time the oscillator drops relay 9 all circuits will return to normal, but the above operations will repeat when relay 9 operates again by action of the oscillator.

The purpose of switch 46—48 is to transfer the holding circuit so that single or double coil relays may be tested.

The dotted sections shown in Figure 1B represent four, six and twelve position sockets to take standard accounting machine relays. This device may be adapted to test telephone or other types of relays by providing the proper connecting means for the particular relays, and parallel connecting the leads to those shown. If the relay is not of the pluggable type; a set of small contact springs, arranged to touch the relay terminals, could be provided; and the relay manually held against these during the test. A set of flexible leads with clips may be provided for non-standard relays.

The invention described herein may be manufactured and used by or for the Government of the United States for governmental purposes without the payment of any royalty thereon or therefor.

What is claimed is:

1. A relay testing device adapted to test relays having a plurality of fixed spaced apart front and back contacts and a plurality of movable contacts activated therebetween by a coil, comprising an oscillator, a timing unit, and a socket board; said oscillator being adjustable for controlling the frequency of successive tests and being adapted to initiate said timing unit; said timing unit comprising a plurality of motor driven cams, one of said cams having selective segments therein for applying potential to the relay under test, the length of said segment selected determining the length of time said potential is applied to the relay coil; said aforementioned socket board being connected to said timing unit in series relationship, terminal means for detachably connecting to said socket board a relay to be tested, said terminal means forming circuit connections for each of said relay contacts and coil, a plurality of indicating means connected to that portion of the aforementioned terminal means which forms circuit connections for said movable contacts, there being an individual indicating means in series relationship with each set of relay contacts, each of said indicating means being adapted to be energized when said relay is de-energized if there is abutment between the movable contact and front contact with which said individual indicating means is associated.

2. A relay testing device adapted to test relays having fixed spaced apart front and back contacts and a movable contact activated therebetween by a coil, comprising an adjustable oscillator for controlling the frequency of successive tests and adapted to initiate a timing device, said timing device comprising a plurality of motor driven cams, one of said cams being adapted to apply a potential impulse of any predetermined duration to the relay coil under test, a socket board connected to said timing device in series relationship, terminal means for detachably connecting to the socket board each of the aforementioned relay contacts and their activating coil, a plurality of indicating means connected to that portion of said terminal means to which said movable contacts are attached, there being an individual indicating means in series relationship with each set of relay contacts, each of said indicating means being adapted to be energized when said relay coil is energized if the back contact and movable contact associated with said individual indicating means are in abutment.

3. A relay testing device adapted to test relays having fixed spaced apart front and back contacts and a coil for activating a movable contact therebetween comprising an adjustable oscillator for determining the frequency of successive tests and adapted to initiate a timing device, said timing device having means for impressing a potential of predetermined duration on the coil of a relay under test, a terminal board adapted to make detachable connections with each of the contacts and coil of said relay, a locking circuit for said relay coil when said coil is energized comprising a circuit completing means one set of contacts of said relay and said relay coil all connected in series relationship, said circuit completing means being responsive to said oscillator to establish said locking circuit, a plurality of indicating means connected to that portion of said terminal means, adapted to connect to said movable contacts, there being an individual indicating means in series relationship with each set of contacts, said indicating means being adapted to be energized when the movable contact and back contact associated therewith are in abutment.

4. A relay testing device adapted to test pick up time of the coil and continuity through the contacts of multiple contact relays comprising an adjustable oscillator for determining the frequency of successive tests, a motor driven cam operated timing unit initiated by said oscillator, one of said cams being adapted to apply a potential of predetermined duration to the relay coil under test, terminal means for connecting the relay under test to said timing unit in series relationship, a locking circuit comprising a circuit completing means said relay coil and one set of said contacts connected in series, said circuit completing means operating under the control of said oscillator, said locking circuit maintaining the relay energized once it has operated, and indicating means connected to said terminal means and adapted to be energized when there is abutment between the said contacts.

ERNEST ROSE.

REFERENCES CITED

The following references are of record in the file of this patent:

UNITED STATES PATENTS

| Number | Name | Date |
| --- | --- | --- |
| 2,086,540 | Diamond | July 13, 1937 |
| 2,120,873 | Skeats | June 14, 1938 |
| 2,205,173 | Peterson | June 18, 1940 |
| 2,279,007 | Mortley | Apr. 7, 1942 |
| 2,369,619 | Stibitz | Feb. 13, 1945 |